United States Patent Office 3,839,542
Patented Oct. 1, 1974

3,839,542
METHOD OF MAKING SUB-MICRON PARTICLES OF METAL CARBIDES OF ENLARGED AND CONTROLLED PARTICLE SIZE
John Donald Chase, Fairfield, Conn., assignor to American Cyanamid Company, Stamford, Conn.
No Drawing. Filed Jan. 4, 1971, Ser. No. 103,861
Int. Cl. C01b 31/30, 31/34, 31/36
U.S. Cl. 423—346
4 Claims

ABSTRACT OF THE DISCLOSURE

Pigmentary sized particles of metal carbides, e.g. titanium carbide and silicon carbide, are produced by reacting a vaporized metal salt with a source of carbon and in the presence of dissociated hydrogen, forming the solid metal carbide in a zone within the region of the reassociation of said hydrogen and collecting said metal carbides from the gas phase.

---

This invention relates to the formation of sub-micron sized particles of metal carbides, particularly silicon carbide, by a gaseous phase reaction featuring an extended zone of particle growth.

It has been known for some time that various inorganic materials in finely divided form have properties different from those of the same materials in their more readily available larger or smaller particle sizes but hitherto methods of producing such inorganic materials in the .1–.3$\mu$ size range have been either non-existent or rather expensive and the high price of the resulting products has restricted their use.

Such a material is silicon carbide which has many uses including abrasives and as an additive to paints.

It is well known that pigment hiding power is principally dependent upon the pigment having a high index of refraction and a suitable particle size. Silicon carbide has the requisite high index of refraction (2.63) comparable to the two principal titanium dioxide pigments, anatase and rutile. However, heretofore it has not been possible to prepare pure silicon carbide in the desired particle size of from 0.1 to 0.3 microns, although numerous methods of producing finely divided silicon carbides have been reported.

Colloidal silicon carbide (100 to 1000 millimicrons particle size) has been reported in U.S. Pat. No. 3,236,673. Preparation was by heating pulverized silicon containing material with an excess of carbonaceous material to a temperature of above 1350° C. and below 1750° C. in an inert gas. By properly controlling the particle size of the starting material and other parameters, colloidal silicon carbide was reportedly produced. Such a process is extremely slow requiring reaction times of one hour or longer.

British Pat. 1,134,782 reports that finely divided silicon carbide was produced by reacting together a silicon tetrahalide and an organic compound in the vapour phase wherein an inert gas or the first reactant vapour or a mixture thereof is passed through a gas-confining tube containing a hot gaseous plasma to heat the inert gas, first reactant vapour or mixture thereof, and the reaction carried out in the hot gas issuing from the gas-confining tube. Although the particle size is not set forth except to note that it is less than one micron our experience leads us to believe that the finely divided particles are essentially all less than 0.05 microns diameter.

Accordingly it is an object of this invention to provide a process for producing metal carbides in an efficient manner nad in a pigmentary particle size range.

In accordance with this invention, there is provided a process for the production of metal carbides having a particle size ranging from about 0.1 to 0.3 microns comprising the steps of reacting a vaporized metal salt with a source of carbon and in the presence of dissociated hydrogen, forming solid metal carbides in a zone of controlled precipitation and growth, said zone being encompassed within the region of hydrogen reassociation and separating said solid metal carbides from the gas phase.

In a preferred embodiment utilizing the process of the invention, pigmentary sized silicon carbide is produced by the reaction of silicon tetrachloride and an organic compound at a reaction and precipitation temperature of from 1000° C. to 3000° C.

Carrying out the process of the present invention does not entail the use of special equipment. Any available high temperature reactor can be employed. Suitable for this purpose are conventional plasma jet or arc devices of the type described in U.S. Letters Pats. 2,616,842; 2,806,124; and 2,858,411. These devices as is well-known, are capable of producing a high density plasma stream of extremely high temperature. This plasma stream is conveniently used to raise the reactants to required temperatures. The plasma stream may be formed with hydrogen or any gas inert to hydrogen such as argon and preferably is the source of the hydrogen.

In addition, radio frequency plasma generators may be used and these, in that they do not require the use of electrodes, can be advantageously employed when products of extremely high purity are required. It is even possible to use a combustion flame as the heat source when a temperature of at least 2000° C. is available as with an oxygen-acetylene flame.

The general procedure employed in utilizing the plasma jet involves heating a gas such as hydrogen, argon, helium, etc., to form a plasma. The reactants are brought either serially or simultaneously into intimate contact with the plasma stream in a manner such that the desired reaction is initiated. The resultant metallic carbide product is secured by quenching the reactor effluent and collecting by conventional means the precipitated powder. The plasma provides the dissociated hydrogen the presence of which provides the exothermic means essential for the temperature control of the formation and growth region of the reaction.

A feature of our method is that it is useful for the production of any kind of metal carbide or mixtures of such carbide. The starting material can be any inorganic metal halide (for example, a chloride or bromide). The metal salts which can be converted are exemplified by silicon, titanium, zirconium, hafnium, vanadium, tantalum, niobium, molybdenum, tungsten, thorium and uranium compounds. It is feasible to use mixtures of such salts. Most important of the compounds which can be converted by the plasma jet carburization process are zirconium tetrahalide, silicon tetrahalide and titanium tetrahalide. These materials give carbide powders used in pigment, abrasives, rubber and paper applications.

The source of carbon in the process includes any organic compound which is vapourizable at the temperatures existing in the reaction zone which will provide carbon for the formation of metal carbide under the conditions of reaction and which does not give rise to undesirable by-products during the reaction. It may advantageously be a hydrocarbon such as methane, purified or sourced from natural gas.

The organic compound and metal halide are conveniently present in the process in a molar ratio of metal, e.g. silicon, to carbon of 1:1 but slight variations of this ratio do not appear to affect greatly the yields obtained. A large excess of one reactant is, however, generally wasteful and therefore undesirable. Where there is an excess of carbon at least some of this may be recovered as finely divided elemental carbon with the metal carbide and it may be removed, if desired, by heating the mixed product in air, for example to a temperature in the range 600° C. to 800° C.

While the plasma jet method of producing metal carbides unquestionably avoids many obstacles and pitfalls associated with previously known synthetic methods, it is not, unfortunately, without its shortcomings. Probably the most significant of these is the speed with which the reaction products are normally quenched to low temperatures. This can be better explained by way of illustration. If the plasma stream is contacted with vaporous salt, the salt is elevated to reaction temperature. If the heated stream continues to the point where the source of carbon is introduced, it is in condition for immediate reaction. As soon as the two reactants meet, the product is formed and tends to be rapidly quenched as it is swept downstream. Unfortunately, this results in sub-pigmentary sized metal carbides which lack utility because of their small size (e.g. decrease in hiding power, decreased abrasion efficiency). This problem is overcome in our invention by the presence of dissociated hydrogen in the reaction zone.

If the plasma gas is not wholly or partially hydrogen, then hydrogen is added to the plasma, either with the reactant feed material or separately. Sufficient hydrogen is added to provide an atomic ratio of hydrogen to metal atoms between 2 and 30 and preferably between 6 and 20.

The hydrogen plays a part in the reaction by minimizing free carbon formation but its main function is to provide a greatly extended high temperature zone in which the particles of the product can grow to sizes that would otherwise not be possible. If a plasma is used as the source of heat, then the combination of high power level and a large quantity of hydrogen will result in most of the heat being used to dissociate the hydrogen and in turn this heat will be liberated when the hydrogen recombines downstream of the plasma at temperatures mainly between 1300° C. and 4000° C. (hydrogen is 50% dissociated at 3100° C. and about 100% dissociated at 3800° C.). Such a condition constitutes an ideal environment for particle growth since the temperature is maintained in the range where the metal carbide formed condenses to the liquid or solid. At temperatures slightly below the condensation temperatures (e.g. about below 2800° C. for silicon carbide), particles will grow either by further condensation of metal carbide vapor on existing nuclei or by agglomeration of already condensed particles.

The apparatus preferably used in this invention consists of a plasma torch which operates either on hydrogen or an inert plasma gas admixed with hydrogen. Adjacent to and immediately downstream of the plasma torch is a feed disk through which the reactants are added to the plasma. Downstream of the feed disk is a reactor tube with a length to diameter ratio greater than 5. The reactor tube is well insulated from the reactor housing as it is important that the reactor be maintained hot. Graphite is an ideal material of construction for the reactor since it can withstand very high temperatures and is chemically inert to both the reactants and products.

The flow rates of the metal salt, the organic compound and hydrogen are chosen in conjunction with the power input to the plasma gas such that the temperature of the mixed reaction products, hydrogen, and plasma gas exceeds 1500° C. at the mid point in the reactor.

The exact temperature of the reaction and condensation zone will depend upon many factors, and, because of heat loss under high temperature conditions, the temperature will vary along the axis of the reactor. Whatever may be the characteristics of the plasma torch used, the temperature of the zone where the condensed carbide is formed and subsequently grows, should be maintained high enough such that the condensed carbide can still grow by the process of agglomeration.

A heat exchanger is attached to and immediately downstream of the reactor housing such that the metal carbide and product gases are cooled to about 200° C. before the solid carbide product is collected in a bag filter or by conventional particle collection methods. The entire system from the torch to the bag filter must be gas tight and operate to exclude air.

A residence time in the reactor of at least 50 milliseconds is required to obtain a carbide product which has an average particle diameter greater than $0.15\mu$ as determined from BET surface area measurement. In certain instances where melting or sublimation of the carbide product occurs at exceptionally high temperatures such as is the case with tungsten carbide, the residence time should be increased to at least 300 milliseconds.

The following examples are presented to further illustrate the present invention. In Examples 1 to 6 use is made of a DC generator and for Example 7 a radio frequency plasma generator. All particle diameter size figures are calculated from BET surface area measurement of the metal carbide.

EXAMPLE 1

The plasma forming gas is argon with a flow rate of 60 g.-moles/hour. The reactants are introduced by separate feed tubes injected into the plasma stream axis at an angle of 45° by tubes angularly displaced one from the other at 90°. The power input to the torch is 10.1 kw. The silicon tetrachloride and methane respective flow rates were each 4.0 g.-moles/hour. The duration of the run was about 40 minutes. The reaction temperature was about 2600° C. Residence time in the zone of formation and growth is estimated at 150 milliseconds.

The silicon carbide product had an average particle diameter of 200 A.

EXAMPLE 2

The procedure of Example 1 was followed except that hydrogen was introduced into the plasma at a mole ratio of $H_2/SiCl_4$ of 5.5. Residence time in the zone of formation and growth is estimated at 120 milliseconds. The silicon carbide product had an average particle diameter of 1440 A. and was predominantly cubic in crystal structure with up to 15% hexagonal. It was estimated that the reactor temperature was about 1900° C.

EXAMPLE 3

The procedure of Example 2 is followed except that the hydrogen was introduced exclusively in admixture with the argon plasma forming gas. In this case the power to the plasma torch was 20 kw.

The silicon carbide product obtained from this procedure would have an average particle diameter of about 1500 A.

EXAMPLE 4

The procedure of Example 2 is to be followed except that the reactants are boron trichloride and methane and the flow rate of these reactants are 4 and 1 gram-moles/hour respectively. Boron carbide of 1350 A. average particle diameter would be obtained from this procedure.

EXAMPLE 5

The procedure of Example 2 is followed except that the reactants are introduced as 4 g.-moles/hour of methyl trichlorosilane at a molar ratio to hydrogen of 0.16. The resulting silicon carbide particles had an average diameter of 1120 A.

EXAMPLE 6

A flow of 4 g.-moles/hour of vaporized tungsten hexachloride, mixed with a flow of 6 g.-moles/hour of methane, is introduced through an aperture in a copper feed disk positioned adjacent to and immediately downstream of a DC plasma torch. A flow of 300 g.-moles/hour of hydrogen is used as the plasma gas. The torch is operated with a power input to the torch of 45 kw. The same apparatus downstream of the plasma torch was used as described in Example 1 except that the reactor was 2 feed away. With a run duration of 41 minutes, a yield of tungsten carbide of 68% is obtained with an average particle diameter of 1100 A.

EXAMPLE 7

A flow of 4 g.-moles/hour of vaporized $TiCl_4$ mixed with a flow of 4 g.-moles/hour of methane and 20 g.-moles/hour of hydrogen is introduced by an axially positioned downstream facing water-cooled probe into the center of an induction plasma. The temperature of the probe was controlled so as to prevent condensation of $TiCl_4$. The total plasma gas flow was 75 g.-moles/hour which gas consisted of a mixture of 15% $H_2$ and 85% argon. A RF generator is utilized herein with a power input of 20 kw. The reactor exit temperature is estimated as 2800° C. Similar to the examples where a DC plasma torch which in turn is connected to a 6 ft. long, 8 in. diameter water-cooled heat exchanger with bag filter located at the downstream end thereof. Titanium carbide is collected with an average particle diameter of 1200 A.

I claim:

1. A process for the production of metal carbides having a particle size ranging from about 0.1 to 0.3 microns comprising the steps of: reacting a vaporized metal halide with a hydrocarbon in the presence of hydrogen at a temperature of at least 1000° C., said metal selected from boron, silicon, titanium, zirconium, hafnium, vanadium, tantalum, niobium, molybdenum, tungsten, thorium and mixtures thereof; forming and growing metal carbides downstream of said reacting in a zone of controlled precipitation and growth having a temperature of from 1300° C. to 4000° C., said carbides having a residence time of at least 50 milliseconds for reacting, forming and growing; and, separating said metal carbides from said gas phase downstream of said zone.

2. Process of Claim 1 wherein hydrogen present is sufficient to provide a ratio of hydrogen to metal atoms between 2 and 30 and preferably between 6 and 20.

3. Process of Claim 1 wherein said metal halide is silicon tetrachloride and said metal carbide is silicon carbide and the temperature does not exceed 3000° C.

4. The process of Claim 1 wherein a methane plasma provides in said reacting step an elevated temperature of at least 1000° C., hydrogen and is the hydrocarbon.

References Cited
UNITED STATES PATENTS 3,340,020    9/1967    Neuenschwander et al.
                                                    23—208 A MILTON WEISSMAN, Primary Examiner U.S. Cl. X.R.

423—291, 440, 252; 106—43, 44

UNITED STATES PATENT OFFICE
CERTIFICATE OF CORRECTION

Patent No. 3,839,542          Dated October 1, 1974

Inventor(s)      JOHN DONALD CHASE

It is certified that error appears in the above-identified patent and that said Letters Patent are hereby corrected as shown below:

Column 1, line 70: "nad" should read -- and --.

Column 3, line 57: "temperatures" should read -- temperature --

Column 5, lines 15 and 16: after "torch" and before "which" please insert -- was used, the reactor is attached to the plasma torch --.

Signed and sealed this 3rd day of December 1974.

(SEAL)
Attest:

McCOY M. GIBSON JR.
Attesting Officer

C. MARSHALL DANN
Commissioner of Patents